(12) United States Patent
D'Souza et al.

(10) Patent No.: US 9,769,829 B2
(45) Date of Patent: Sep. 19, 2017

(54) TECHNIQUES FOR OPTIMIZING TRANSMISSION POWER ALLOCATION IN WIRELESS COMMUNICATIONS

(71) Applicant: QUALCOMM Incorporated, San Diego, CA (US)

(72) Inventors: Luna Sapna D'Souza, San Diego, CA (US); Arvindhan Kumar, San Diego, CA (US); Chetan Gopalakrishnan Chakravarthy, San Diego, CA (US); Murali Paravath Menon, Acton, MA (US); Omesh Kumar Handa, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 14/579,004

(22) Filed: Dec. 22, 2014

(65) Prior Publication Data

US 2016/0029391 A1 Jan. 28, 2016

Related U.S. Application Data

(60) Provisional application No. 62/029,952, filed on Jul. 28, 2014.

(51) Int. Cl.
*H04B 7/216* (2006.01)
*H04W 72/04* (2009.01)
(Continued)

(52) U.S. Cl.
CPC ..... *H04W 72/0473* (2013.01); *H04W 52/286* (2013.01); *H04W 52/346* (2013.01);
(Continued)

(58) Field of Classification Search
CPC .................. H04W 72/0413; H04W 52/146
(Continued)

(56) References Cited

U.S. PATENT DOCUMENTS 8,295,779 B2  10/2012  Cave et al.
8,457,056 B2   6/2013  Zhang et al.
(Continued)

FOREIGN PATENT DOCUMENTS

WO    WO-2007/020575 A1    2/2007

OTHER PUBLICATIONS

International Search Report and Written Opinion—PCT/US2015/040159—ISA/EPO—Sep. 11, 2015 (12 total pages).
(Continued)

*Primary Examiner* — Ricky Ngo
*Assistant Examiner* — Dewanda Samuel
(74) *Attorney, Agent, or Firm* — Arent Fox, LLP

(57) ABSTRACT

Aspects related to allocating transmission power in wireless communications are described. It can be determined whether data is to be transmitted on an uplink control channel in one or more upcoming transmission time intervals (TTIs). Based on this determination, transmission power is allocated to an uplink enhanced dedicated channel in the one or more upcoming TTIs. Where uplink control channel data is not to be transmitted in the one or more upcoming TTIs, transmission power that would have been used for the uplink control channels can instead be allocated to the enhanced dedicated channel.

28 Claims, 8 Drawing Sheets

(51) Int. Cl.
*H04W 52/28* (2009.01)
*H04W 52/34* (2009.01)
*H04W 52/14* (2009.01)
*H04W 52/44* (2009.01)

(52) U.S. Cl.
CPC ...... *H04W 72/0413* (2013.01); *H04W 52/146* (2013.01); *H04W 52/44* (2013.01)

(58) Field of Classification Search
USPC .................................................. 370/335, 329
See application file for complete search history.

(56) References Cited

U.S. PATENT DOCUMENTS

| | | | |
|---|---|---|---|
| 8,554,257 B2 | 10/2013 | Hannu et al. | |
| 8,774,138 B2 * | 7/2014 | Ramos | H04W 72/1252 370/311 |
| 2006/0198338 A1 * | 9/2006 | Ishii | H04L 47/10 370/329 |
| 2008/0013499 A1 * | 1/2008 | Ratasuk | H04W 52/16 370/338 |
| 2008/0132184 A1 * | 6/2008 | Wan | H04W 52/265 455/115.1 |
| 2011/0032885 A1 * | 2/2011 | Wang | H04W 72/0486 370/329 |
| 2011/0141960 A1 * | 6/2011 | Liu | H04L 1/0022 370/311 |
| 2011/0171991 A1 | 7/2011 | Liu et al. | |
| 2013/0021915 A1 | 1/2013 | Catovic et al. | |
| 2013/0343328 A1 | 12/2013 | Nilsson et al. | |

OTHER PUBLICATIONS

QUALCOMM Incorporated: "HS-DPCCH Overhead Reduction", 3GPP Draft; R1-141715 HS-DPCCH Overhead Reduction, 3rd Generation Partnership Project (3GPP), Mobile Competence Centre; 659, Route Des Lucioles ; F06921 Sophia-Antipolis Cedex ; France vol. RAN WG1, No. Shenzhen, China; 20140331-20140404 Mar. 30, 2014 (Mar. 30, 2014), p.-3, XP050787382, Retrieved from the Internet: URL:http://www.3gpp.org/ftp/Meetings_3GPP_SVNC/RAN1/Docs/ [retrieved on Mar. 30, 2014] Section 2.1.1-2.1.2 Section 2.2.

* cited by examiner

TECHNIQUES FOR OPTIMIZING TRANSMISSION POWER ALLOCATION IN WIRELESS COMMUNICATIONS

CLAIM OF PRIORITY UNDER 35 U.S.C. §119

The present Application for Patent claims priority to Provisional Application No. 62/029,952 entitled "TECHNIQUES FOR OPTIMIZING TRANSMISSION POWER ALLOCATION IN WIRELESS COMMUNICATIONS" filed Jul. 28, 2014, which is assigned to the assignee hereof and hereby expressly incorporated by reference herein.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is High Speed Packet Access (HSPA). HSPA is a set of enhancements to the Universal Mobile Telecommunications System (UMTS) mobile standard promulgated by Third Generation Partnership Project (3 GPP).

In HSPA, transmit power for high speed dedicated physical control channel (HS-DPCCH) is allocated before power allocation for an enhanced dedicated channel (E-DCH) at a user equipment (UE). The UE allocates power for the HS-DPCCH at each transmit time interval assuming a worst case transmission of acknowledgement (ACK)/non-acknowledgment (NAK) and channel quality indicator (CQI) data such that power may be allocated to HS-DPCCH in some scenarios where ACK/NAK and CQI data are not transmitted in a given transmission time interval (TTI). Allocating power to channels that have no data to transmit, in this regard, can cause unnecessary consumption of power headroom. When the UE is at a cell edge, and thus operating using high HS-DPCCH power, avoiding unnecessary consumption of power headroom may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of allocating transmission power in wireless communications is described. The method includes determining whether data is to be transmitted on an uplink control channel in one or more upcoming transmission time intervals (TTIs), and allocating transmission power to an uplink enhanced dedicated channel in the one or more upcoming TTIs based at least in part on the determining.

In another aspect, an apparatus for allocating transmission power in wireless communications is described. The apparatus includes a channel transmission determining component configured to determine whether data is to be transmitted on an uplink control channel in one or more upcoming TTIs, and a power allocating component configured to allocate transmission power to an uplink enhanced dedicated channel in the one or more upcoming TTIs based at least in part on the channel transmission determining component determining whether the data is to be transmitted on the uplink control channel.

In yet another aspect, an apparatus for allocating transmission power in wireless communications is described. The apparatus includes means for determining whether data is to be transmitted on an uplink control channel in one or more upcoming TTIs, and means for allocating transmission power to an uplink enhanced dedicated channel in the one or more upcoming TTIs based at least in part on the means for determining determining whether the data is to be transmitted on the uplink control channel.

In still a further aspect, a computer-readable medium storing computer executable code for allocating transmission power in wireless communications is described. The computer-readable medium includes code executable to determine whether data is to be transmitted on an uplink control channel in one or more upcoming TTIs, and code executable to allocate transmission power to an uplink enhanced dedicated channel in the one or more upcoming TTIs based at least in part on whether the data is to be transmitted on the uplink control channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
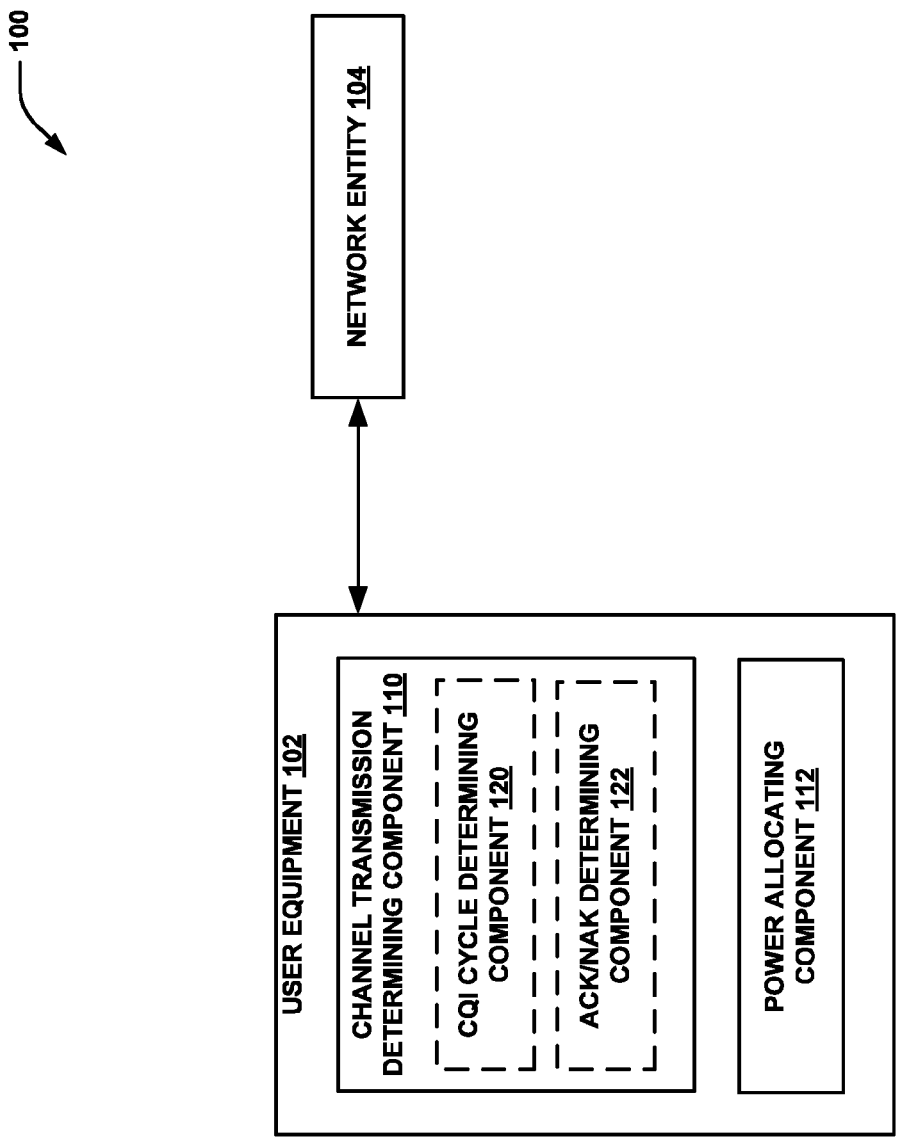
FIG. 1 is a block diagram illustrating an example wireless communications system according to aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various aspects related to allocating transmission power to one or more channels based at least in part on determining whether certain uplink control channels are to be transmitted in one or more upcoming transmission time intervals (TTIs). For example, where uplink control channel transmission are not going to be transmitted in the upcoming TTIs, transmit power for the upcoming TTIs can be allocated to uplink enhanced dedicated channel (E-DCH) transmissions. Allocating transmit power for the E-DCH can include determining an E-DCH transport format identifier (E-TFCI) selection. Determining whether uplink control channels are to be transmitted can be based at least in part on determining whether data exists for transmission over the uplink control channels. This can be based at least in part on whether a configured channel quality indicator (CQI) feedback cycle indicates CQI data is to be transmitted in the TTI, whether acknowledgement (ACK)/non-acknowledgement (NAK) data is to be transmitted in the TTI for data previously received over a downlink channel, and/or the like. Considering whether data is to be transmitted over the uplink control channels, in this regard, allows for improved allocation of transmit power. For example, a user equipment (UE) can intelligently allocate power when high-speed dedicated physical control channel (HS-DPCCH) is to be transmitted for HS-DPCCH ACK/NAK or CQIs based on estimation, but can refrain from allocating power (or can allocate lesser power) to these channels when no HS-DPCCH ACK/NAK or CQI is going to be transmitted. Thus, this additional power may be allocated to E-DCH transmissions. This can result in significant throughput improvements in power limited scenarios by efficiently using this power for E-DCH transmissions (e.g., via E-TFCI selection) instead Referring to FIGS. 1 and 2, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIG. 2 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 2:
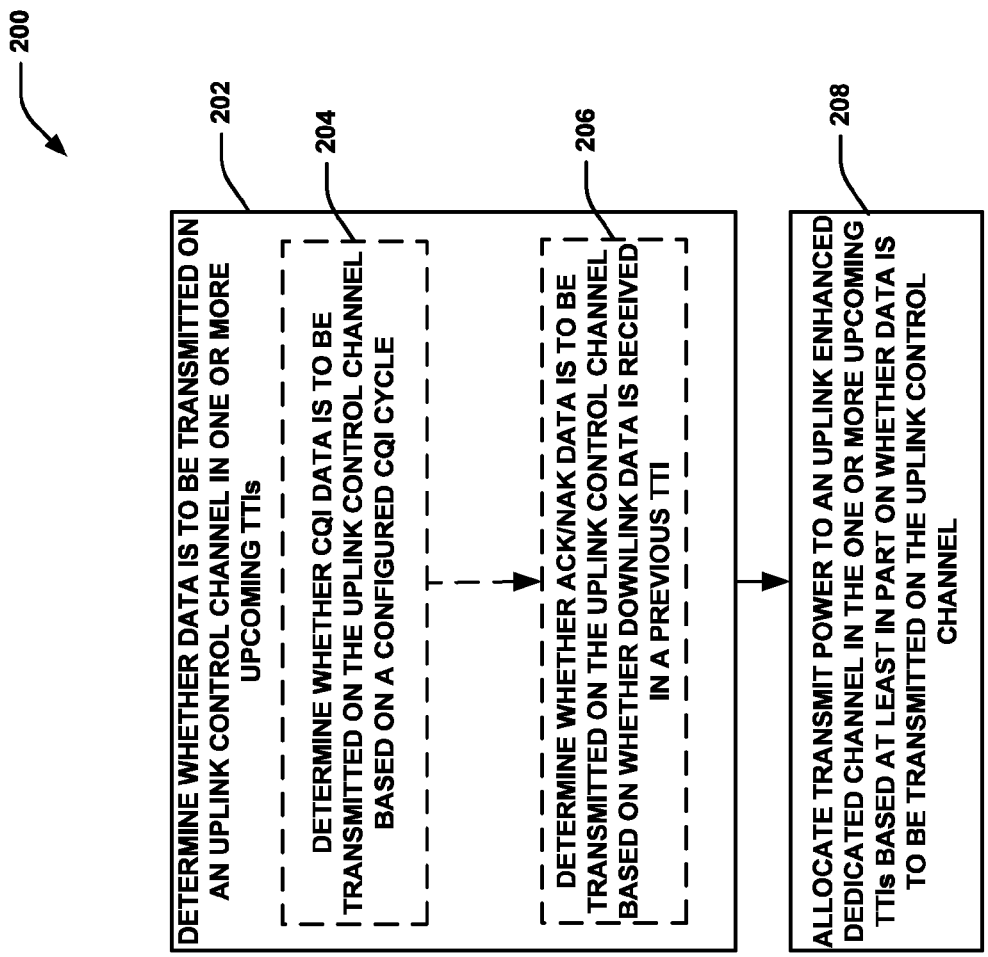
FIG. 2 is a flow diagram comprising a plurality of functional blocks representing an example methodology aspects described herein.

FIG. 1 is a schematic diagram illustrating a system 100 for wireless communication, according to an example configuration. System 100 includes a user equipment (UE) 102 that communicates with a network entity 104 in one or more wireless networks. It is to be appreciated that multiple UEs 102 can communicate with a network entity 104 and/or UE 102 can communicate with multiple network entities 104 in some network configurations. Moreover, UE 102 and network entity 104 can communicate over multiple carriers, as described further herein, to facilitate improved throughput, functionality, reliability of communications, etc.

According to an aspect, UE 102 is operable to allocate transmission power for one or more uplink channels configured for communicating with the network entity 104. UE 102 can include a channel transmission determining component 110 to determine whether transmissions are to occur on a channel in one or more upcoming TTIs, and a power allocating component 112 for determining a power allocation for one or more other channels based on the determination of whether transmissions are to occur on the channel in the one or more upcoming TTIs. Channel transmission determining component 110 can include a CQI cycle determining component 120 for determining a CQI feedback cycle assigned to the UE 102 for communicating CQI of downlink communications to the network entity 104 over the channel, and/or an ACK/NAK determining component 122 for determining one or more TTIs during which to send ACK/NAK feedback for downlink communications received from the network entity 104 over the channel.

UE 102 may comprise any type of mobile device, such as, but not limited to, a smartphone, cellular telephone, mobile phone, laptop computer, tablet computer, or other portable networked device that can be a standalone device, tethered to another device (e.g., a modem connected to a computer), a watch, a personal digital assistant, a personal monitoring device, a machine monitoring device, a machine to machine communication device, and/or the like. In addition, UE 102 may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air (OTA) communication link using one or more OTA communication protocols described herein. Additionally, in some examples, UE 102 may be configured to facilitate communication on multiple separate networks via multiple separate subscriptions, multiple radio links, and/or the like.

Furthermore, network entity 104 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a mobility management entity (MME), a radio network controller (RNC), a small cell, etc. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, network entity 104 may communicate with one another and/or with one or more other network entities of wireless and/or core networks Additionally, system 100 may include any network type, such as, but not limited to, wide-area networks (WAN), wireless networks (e.g. 802.11 or cellular network, such as Global System for Mobile Communications (GSM) or its derivatives, etc.), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, network entity 104) may be coupled to a core network via one or more wired or wireless connections.

FIG. 2 illustrates a method 200 for allocating power to one or more uplink channels based on whether data is to be transmitted in upcoming TTIs. Method 200 includes, at Block 202, determining whether data is to be transmitted on an uplink control channel in one or more upcoming TTIs. In an aspect, channel transmission determining component 110 (FIG. 1) can determine whether data is to be transmitted on the uplink channel in one or more upcoming TTIs.

In one example, determining whether data is to be transmitted in the one or more upcoming TTIs may optionally include, at Block 204, determining whether CQI data is to be transmitted on the uplink control channel based on a configured CQI cycle. Channel transmission determining component 110 can determine whether CQI data is to be transmitted on the uplink control channel based on the configured CQI cycle. For example, CQI cycle determining component 120 can determine a CQI feedback cycle for the UE 102, which UE 102 can utilize for reporting CQI feedback related to communications received over one or more downlink channels configured by network entity 104. In some examples, a CQI feedback cycle can relate to an interval at which CQI is to be reported, and can typically be greater than 2 milliseconds (ms), meaning that CQI is reported in at least a 2 ms interval. Thus, there can be multiple TTIs within the 2 ms during which the UE 102 is not transmitting CQI, and channel transmission determining component 110 can determine these TTIs (and/or determine whether one or more of a number of upcoming TTIs include CQI transmission) based on the cycle and a current TTI, for example. In a specific example (e.g., in HSPA), channel transmission determining component 110 may evaluate up to 5 slots in advance (where each slot is 0.5 ms) to determine during which slots CQI feedback is expected based on the CQI feedback cycle.

It is to be appreciated that CQI cycle determining component 120 can determine the CQI feedback cycle as a configured CQI feedback cycle based on one or more parameters configured at the UE 102 regarding the cycle. For example, parameters related to the CQI feedback cycle may be hardcoded in the UE 102, received in a configuration stored at the UE 102, received in a configuration from the network (e.g., from network entity 104 or another network entity), etc. In a specific example, the CQI feedback cycle parameters may facilitate determining a last TTI used for CQI feedback transmission until a next TTI according to the cycle. In another example, channel transmission determining component 110 can determine a last TTI used for CQI feedback transmission until a next TTI (e.g., based on determining a TTI, after the first TTI in the CQI feedback cycle, in which CQI is not transmitted).

In an additional or alternative example, determining whether data is to be transmitted in the one or more upcoming TTIs may optionally include, at Block 206, determining whether ACK/NAK data is to be transmitted on the uplink control channel based on whether downlink data is received in a previous TTI. Channel transmission determining component 110 can determine whether ACK/NACK data is to be transmitted on the uplink control channel based on whether downlink data is received in a previous TTI. For example, ACK/NAK determining component 122 can determine one or more TTIs during which the UE 102 is to transmit ACK/NAK for received downlink data. For example, where the UE 102 receives downlink data from network entity 104 (e.g., over a high speed physical downlink shared channel (HS-PDSCH or other downlink shared channel)) in a TTI, UE 102 may be configured to report ACK/NAK for the downlink data in a subsequent TTI. This can be a given TTI scheduled for ACK/NAK transmissions related to the received data (e.g., in a scheduling grant received from network entity 104), a TTI that is a certain number of TTIs after the TTI in which the data is received (e.g., 7.5 slots in HSPA), etc. Thus, ACK/NAK determining component 122 can determine a current TTI or one or more upcoming TTIs during which the UE 102 is to transmit ACK/NAK feedback based at least in part on whether data is received from the network entity 104 in one or more previous TTIs. It is to be appreciated that the TTIs (e.g., and/or identifying information of the TTIs, such as frame or subframe index, slot number, etc.) for transmitting ACK/NAK feedback may be hardcoded in the UE 102, received in a configuration stored at the UE 102, received in a configuration from the network (e.g., from network entity 104 or another network entity), determined based on such configurations (e.g., and/or whether data is received over the HS-PDSCH), etc.

Accordingly, channel transmission determining component 110 may determine whether uplink data is to be transmitted in one or more of a plurality of upcoming TTIs based at least in part on the CQI feedback cycle and/or a determination of whether ACK/NAK feedback is to be transmitted for communications received over HS-PDSCH in the one or more of the plurality of upcoming TTIs. For example, channel transmission determining component 110 can evaluate a number of slots (e.g., 5 slots in advance) to determine whether CQI transmission is scheduled in any of the number of slots. In another example, channel transmission determining component 110 can determine whether HS-PDSCH decodes are scheduled for which ACK/NAK is to be transmitted in upcoming slots. As described below, in slots where CQI and/or ACK/NAK data transmissions are not scheduled, power can instead be allocated to data channels other than uplink control channels to facilitate improved power allocation.

Accordingly, method 200 also includes, at Block 208, allocating transmit power to an uplink E-DCH in the one or more upcoming TTIs based at least in part on whether data is to be transmitted on the uplink control channel. Power allocating component 112 (FIG. 1) can allocate transmit power to the uplink E-DCH in the one or more upcoming TTIs based at least in part on whether data is to be transmitted on the uplink control channel (as determined by channel transmission determining component 110). For example, in TTIs during which data is not to be transmitted on the uplink control channel, power allocating component 112 may allocate all available power, or power that would otherwise be allocated to the HS-PDCCH, to the E-DCH. In another example, power allocating component 112 may allocate all available power, or power that would otherwise be allocated to the HS-PDCCH, to the E-DCH in a portion of the one or more upcoming TTIs during which it is determined that no data is to be transmitted over the uplink control channel. Moreover, for example, power allocating component 112 may allocate some power to the HS-PDCCH and remaining power to the E-DCH based at least in part on determining that some data is to be transmitted over the uplink control channel in at least a portion of the one or more upcoming TTIs.

In one example, the one or more upcoming TTIs may correspond to slots that are configured for transmission at the UE 102 in a discontinuous transmit (DTX) mode. For instance, slots related to the uplink control channels may overlap slots that can be configured for E-DCH transmission and/or power allocation. Where these slots are contiguously allocated in DTX, allowing the additional power allocation to E-DCH where uplink control channel transmission is not expected can result in significant throughput improvements at the UE 102. In this example, channel transmission determining component 110 can evaluate overlapping HS-DPCCH slots for DTX starting 2 ms before E-DCH power allocation, and power allocating component 112 can accordingly determine the power allocation in corresponding slots for E-DCH and/or HS-DPCCH (where transmissions thereover are expected).

In addition, providing the additional power allocation to E-DCH in the one or more upcoming TTIs (or portion thereof) can allow for selecting an improved E-TFCI for the UE 102. This can improve performance in many cases including where the UE 102 is at the cell edge and thus uses a large power allocation to transmit control data over HS-PDCCH. In this example, power normally allocated for HS-PDCCH transmissions can be allocated for E-DCH, which can be used in selecting E-TFCI assuming TTIs where no transmission is to occur over HS-PDCCH. This can allow for selection of a higher E-TFCI, which can result in improved performance of E-DCH communications based on the selected E-TFCI. In addition, it is to be appreciated that the UE 102 can communicate with network entity 104 over multiple carriers (not shown). In this example, power allocating component 112 can determine power allocation for channels on each of the multiple carriers based on determining whether channel transmission determining component 110 determines that data is to be transmitted in upcoming TTIs in the channels over each of the multiple carriers.

Figure 3:
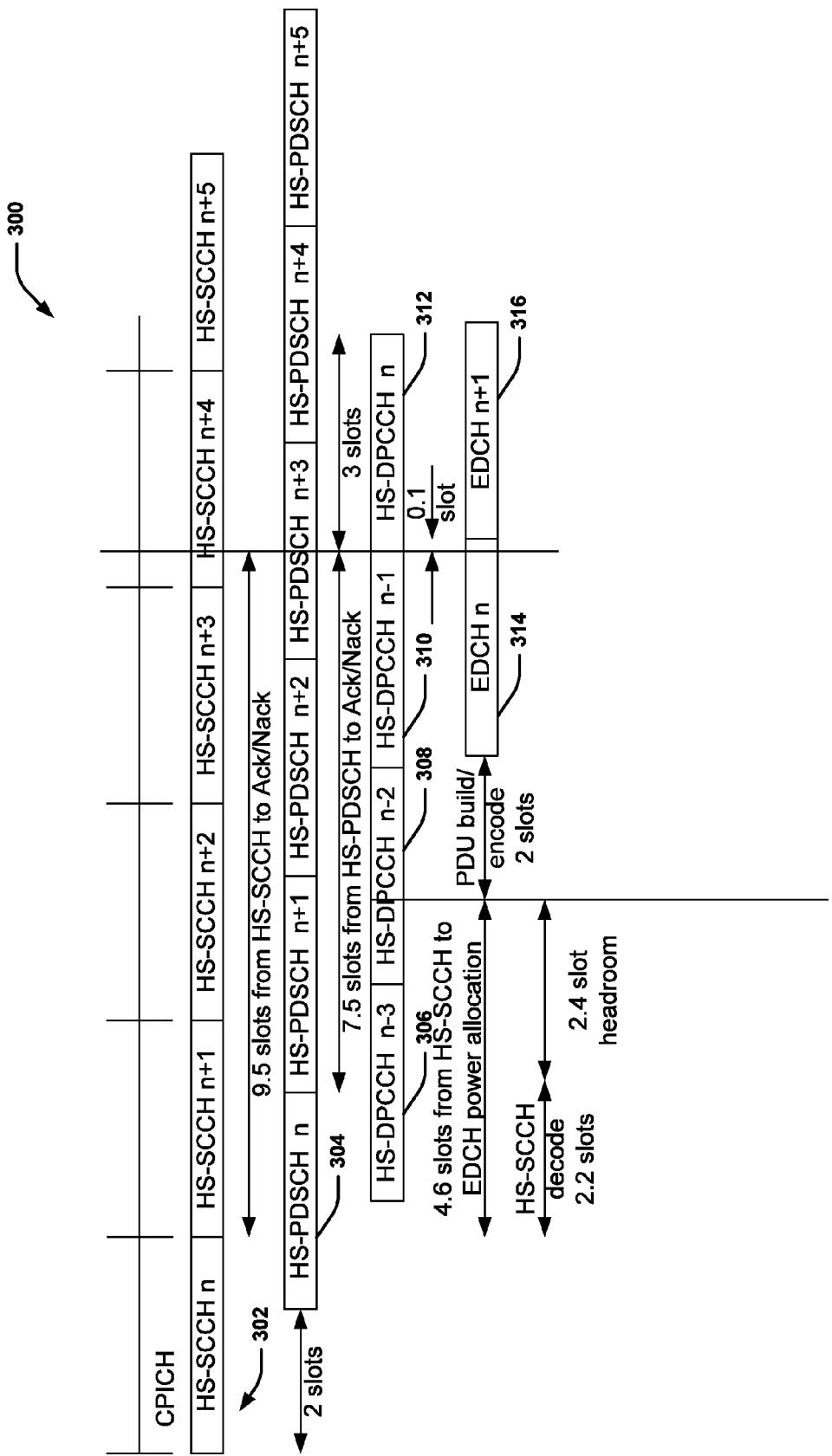
FIG. 3 is a diagram of an example transmission timeline for a UE and network entity in accordance with aspects described herein

FIG. 3 illustrates an example transmission timeline 300 for a UE and network entity in accordance with aspects described herein. Timeline 300 includes high-speed shared control channel (HS-SCCH) over which a common pilot channel (CPICH) is transmitted, which is represented by HS-SCCH subframes 302 labeled n to n+5, where n is a positive integer that may represent a subframe number. Timeline 300 also includes a plurality of HS-PDSCH channel subframe 304 (and similar subframes) transmitted by a network entity, and a number of HS-DPCCH subframes, such as subframes 306, 308, 310, and 312, transmitted by a UE. Moreover, timeline 300 includes a plurality of E-DCH subframes, such as subframes 314 and 316, transmitted by the UE. In this example, as described, the UE can determine whether HS-PDCCH transmissions are expected in subframes 310, 312, etc., and can accordingly allocate power to E-DCH in subframes 314 and/or 316 that overlap subframes 310 and/or 312 based on whether HS-PDCCH transmissions are expected in subframes 310 and 312. For example, the UE can determine whether ACK/NAK transmissions are expected in subframe 312 based at least in part on whether downlink transmissions that are to be acknowledged are received in subframe 304 over the HS-PDSCH.

Figure 4:
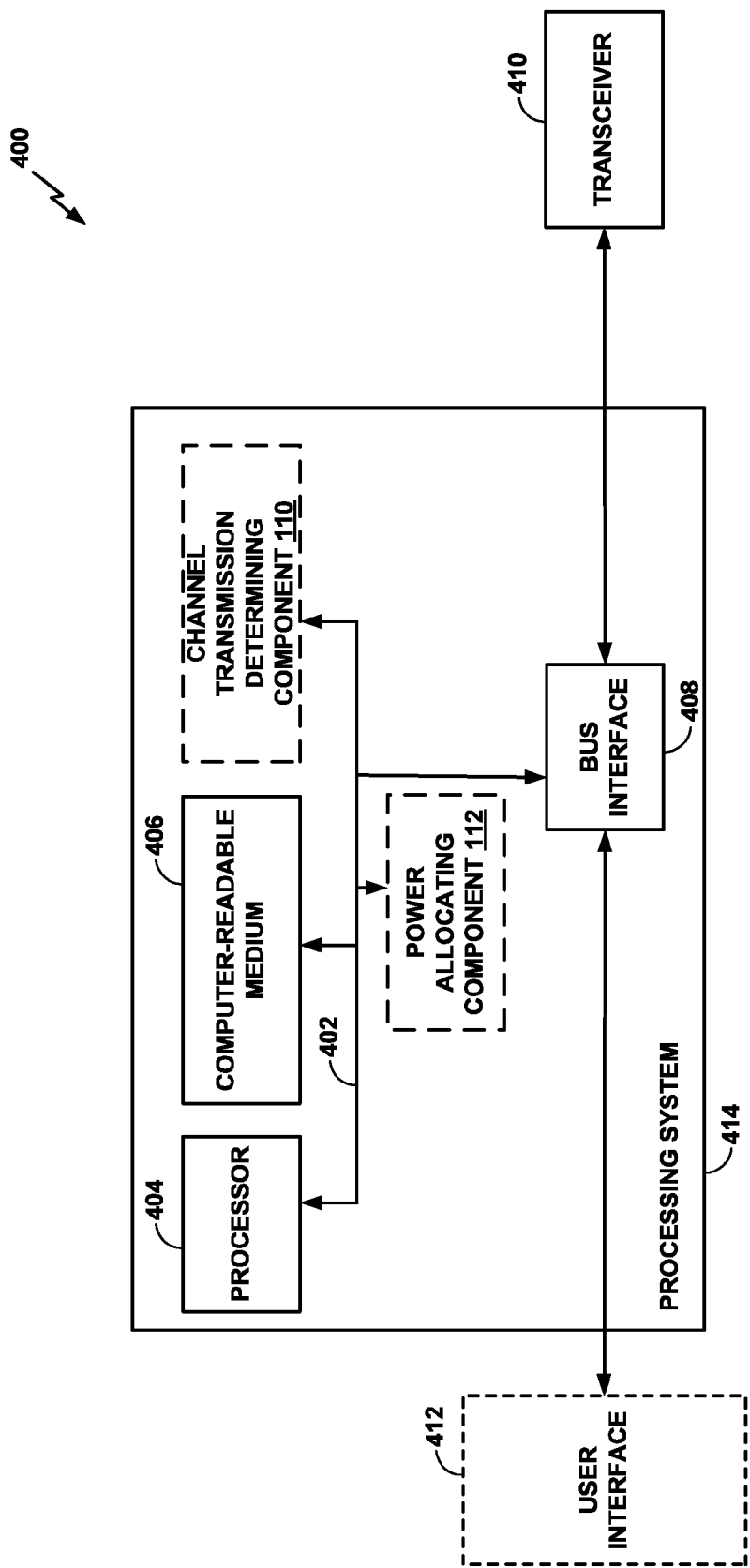
FIG. 4 is a diagram illustrating an example of a hardware implementation for an apparatus employing a processing system.

FIG. 4 is a conceptual diagram illustrating an example of a hardware implementation for an apparatus 400 employing a processing system 414 for allocating transmission power, as described herein. In some examples, the processing system 414 may comprise a UE or a component of a UE (e.g., UE 102 of FIG. 1, and/or one or more components thereof, etc.). In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, computer-readable media, represented generally by the computer-readable medium 406, channel transmission determining component 110, power allocating component 112, components thereof, etc. (e.g., in FIG. 1), which may be configured to carry out one or more methods or procedures described herein (e.g., method 200 in FIG. 2) to allocate transmit power to certain channels.

The bus 402 may also link various other circuits such as timing sources, peripherals, voltage regulators, and power management circuits, which are well known in the art. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

In an aspect, processor 404, computer-readable medium 406, or a combination of both may be configured or otherwise specially programmed to perform the functionality of the channel transmission determining component 110, power allocating component 112, components thereof, etc. (see FIG. 1), or various other components described herein. For example, processor 404, computer-readable medium 406, or a combination of both may be configured or otherwise specially programmed to perform the functionality of the channel transmission determining component 110, power allocating component 112, components thereof, etc. described herein (e.g., the method 200 in FIG. 2, according to the transmission timeline in FIG. 3, etc.), and/or the like.

Figure 5:
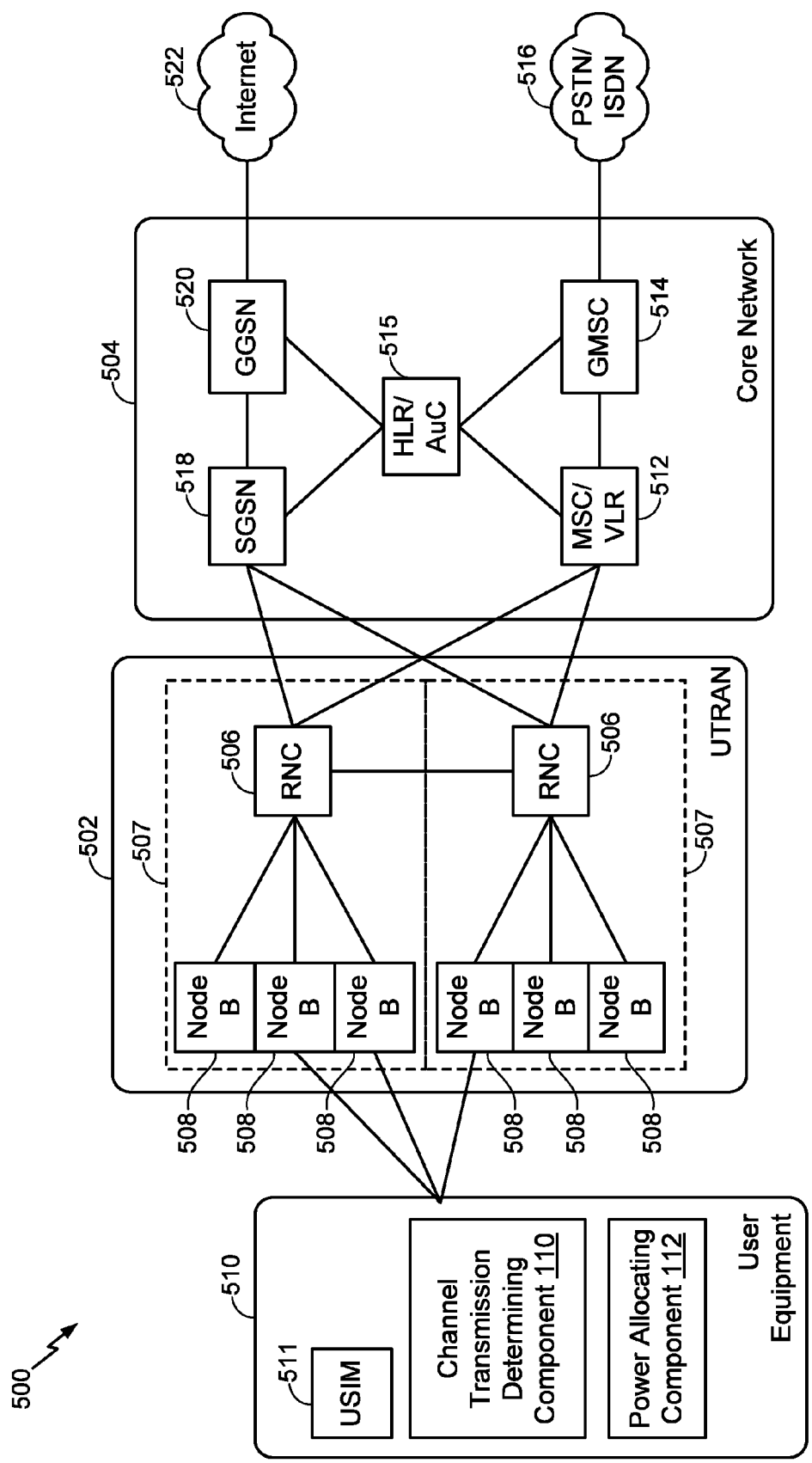
FIG. 5 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 5 are presented with reference to a UMTS system 500 employing a W-CDMA air interface and operable for allocating transmission power as described herein. A UMTS network includes three interacting domains: a Core Network (CN) 504, a UMTS Terrestrial Radio Access Network (UTRAN) 502, and User Equipment (UE) 510. UE 510 can include a channel transmission determining component 110, power allocating component 112, components thereof, etc. (e.g., in FIG. 1), which may be configured to carry out one or more methods or procedures described herein (e.g., method 200 in FIG. 2) to allocate transmit power to certain channels. In this example, the UTRAN 502 provides various wireless services including telephony, video, data, messaging, broadcasts, and/or other services. For example, UE 510 can correspond to one or more UEs described herein (such as UE 102, FIG. 1) and/or can include one or more components thereof (e.g., channel transmission determining component 110, power allocating component 112, etc.). The UTRAN 502 may include a plurality of Radio Network Subsystems (RNSs) such as an RNS 507, each controlled by a respective Radio Network Controller (RNC) such as an RNC 506. Here, the UTRAN 502 may include any number of RNCs 506 and RNSs 507 in addition to the RNCs 506 and RNSs 507 illustrated herein. The RNC 506 is an apparatus responsible for, among other things, assigning, reconfiguring and releasing radio resources within the RNS 507. The RNC 506 may be interconnected to other RNCs (not shown) in the UTRAN 502 through various types of interfaces such as a direct physical connection, a virtual network, or the like, using any suitable transport network.

Communication between a UE 510 and a Node B 508 may be considered as including a physical (PHY) layer and a medium access control (MAC) layer. Further, communication between a UE 510 and an RNC 506 by way of a respective Node B 508 may be considered as including a radio resource control (RRC) layer. In the instant specification, the PHY layer may be considered layer 1; the MAC layer may be considered layer 2; and the RRC layer may be considered layer 3, as described in further detail with respect to FIG. 7. In addition, the Node B 508 and/or RNC 506 can be a network entity described herein (e.g., network entity 104, FIG. 1).

The geographic region covered by the RNS 507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each RNS 507; however, the RNSs 507 may include any number of wireless Node Bs. The Node Bs 508 provide wireless access points to a CN 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 510 may further include a universal subscriber identity module (USIM) 511, which contains a user's subscription information to a network. For illustrative purposes, one UE 510 is shown in communication with a number of the Node Bs 508. The DL, also called the forward link, refers to the communication link from a Node B 508 to a UE 510, and the UL, also called the reverse link, refers to the communication link from a UE 510 to a Node B 508.

The CN 504 interfaces with one or more access networks, such as the UTRAN 502. As shown, the CN 504 is a GSM core network. However, as those skilled in the art will recognize, the various concepts presented throughout this disclosure may be implemented in a RAN, or other suitable access network, to provide UEs with access to types of CNs other than GSM networks.

The CN 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a VLR that contains subscriber-related information for the duration that a UE is in the coverage area of the MSC 512. The GMSC 514 provides a gateway through the MSC 512 for the UE to access a circuit-switched network 516. The GMSC 514 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The CN 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 510 through the SGSN 518, which performs primarily the same functions in the packet-based domain as the MSC 512 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 508 and a UE 510. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the HS-DPCCH.

Among these physical channels, the HS-DPCCH carries the HARQ ACK/NACK signaling on the uplink to indicate whether a corresponding packet transmission was decoded successfully. That is, with respect to the downlink, the UE 510 provides feedback to the node B 508 over the HS-DPCCH to indicate whether it correctly decoded a packet on the downlink.

HS-DPCCH further includes feedback signaling from the UE 510 to assist the node B 508 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 508 and/or the UE 510 may have multiple antennas supporting MIMO technology. The use of MIMO technology enables the node B 508 to exploit the spatial domain to support spatial multiplexing, beamforming, and transmit diversity.

Figure 6:
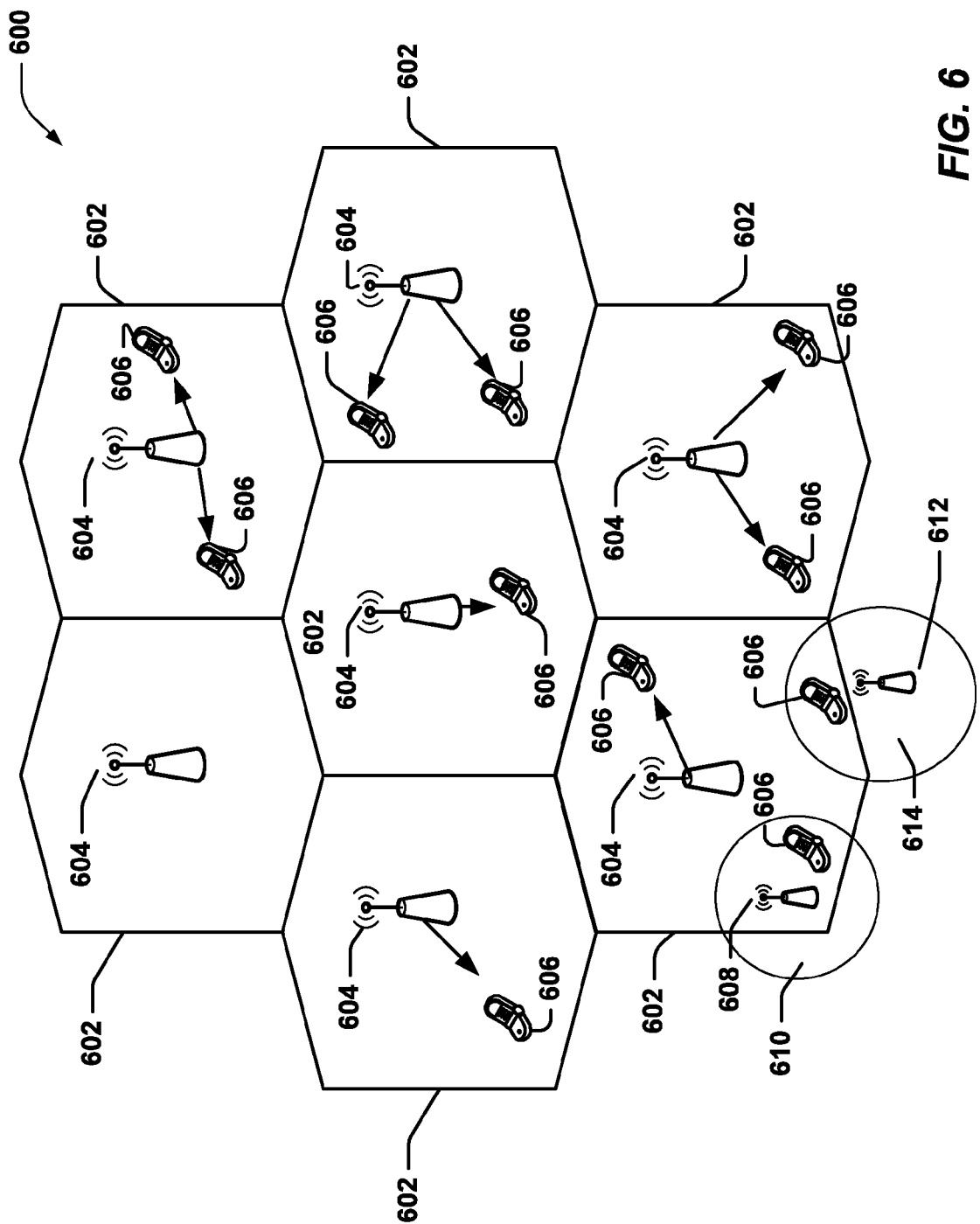
FIG. 6 is a diagram illustrating an example of an access network.

FIG. 6 is a diagram illustrating an example of an access network, including one or more UEs operable to allocate transmission power, as described herein. In this example, the access network 600 is divided into a number of cellular regions (cells) 602. One or more lower power class Node Bs 608, 612 may have cellular regions 610, 614, respectively, that overlap with one or more of the cells 602. The lower power class Node Bs 608, 612 may be small cells (e.g., home Node Bs (HNBs)). A higher power class or macro Node B 604 is assigned to a cell 602 and is configured to provide an access point in a UTRAN 502 to a core network 504 for all the UEs 606 in the cell 602. There is no centralized controller in this example of an access network 600, but a centralized controller may be used in alternative configurations. The Node B 604 is responsible for all radio related functions including radio bearer control, admission control, mobility control, scheduling, security, and connectivity to one or more components of a core network 504, etc. In an aspect, one or more of the Node Bs 604, 608, 612 may represent an example of network entity 104 of FIG. 1.

The modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The Node B 604 may have multiple antennas supporting multiple-input, multiple output (MIMO) technology. The use of MIMO technology enables the Node B 604 to exploit the spatial domain to support spatial multiplexing, beamforming, and transmit diversity.

Spatial multiplexing may be used to transmit different streams of data simultaneously on the same frequency. The data steams may be transmitted to a single UE 606 to increase the data rate or to multiple UEs 606 to increase the overall system capacity. This is achieved by spatially precoding each data stream and then transmitting each spatially precoded stream through a different transmit antenna on the downlink. The spatially precoded data streams arrive at the UE(s) 606 with different spatial signatures, which enables each of the UE(s) 606 to recover the one or more data streams destined for that UE 606. On the uplink, each UE 606 transmits a spatially precoded data stream, which enables the Node B 604 to identify the source of each spatially precoded data stream. In an aspect, UE 606 may represent an example of UE 102, and may include one or more of its various components described in FIG. 1, such as a channel transmission determining component 110, power allocating component 112, components thereof, etc. (e.g., in FIG. 1), which may be configured to carry out one or more methods or procedures described herein (e.g., method 200 in FIG. 2) to allocate transmit power to certain channels.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 7:
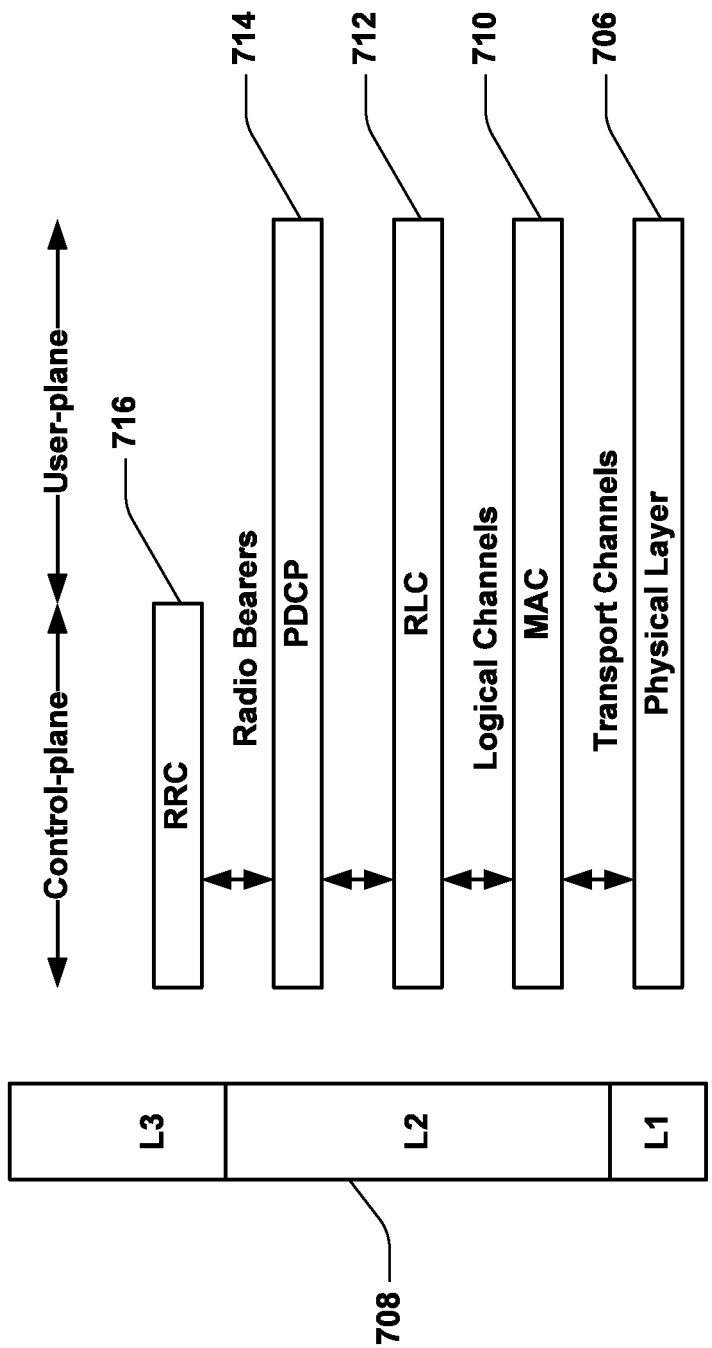
FIG. 7 is a diagram illustrating an example of a radio protocol architecture for the user and control plane.

Turning to FIG. 7, the radio protocol architecture for a UE (e.g., UE 102 with one or more of its various components as described in FIG. 1) and an Node B (e.g., network entity 104 of FIG. 1) is shown with three layers: Layer 1, Layer 2, and Layer 3. Layer 1 is the lowest layer and implements various physical layer signal processing functions. Layer 1 will be referred to herein as the physical layer 706. Thus, for example, a UE described herein may include channel transmission determining component 110, power allocating component 112, components thereof, etc. (e.g., in FIG. 1), which may be configured to carry out one or more methods or procedures described herein (e.g., method 200 in FIG. 2) to allocate transmit power to certain channels at Layer 1. Layer 2 (L2 layer) 708 is above the physical layer 706 and is responsible for the link between the UE and Node B over the physical layer 706.

In the user plane, the L2 layer 708 includes a media access control (MAC) sublayer 710, a radio link control (RLC) sublayer 712, and a packet data convergence protocol (PDCP) 714 sublayer, which are terminated at the Node B on the network side. Although not shown, the UE may have several upper layers above the L2 layer 708 including a network layer (e.g., IP layer) that is terminated one or more components of core network 504 (see FIG. 5) on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between Node Bs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

In the control plane, the radio protocol architecture for the UE and Node B is substantially the same for the physical layer 706 and the L2 layer 708 with the exception that there is no header compression function for the control plane. The control plane also includes a radio resource control (RRC) sublayer 716 in Layer 3. The RRC sublayer 716 is responsible for obtaining radio resources (i.e., radio bearers) and for configuring the lower layers using RRC signaling between the Node B and the UE.

Figure 8:
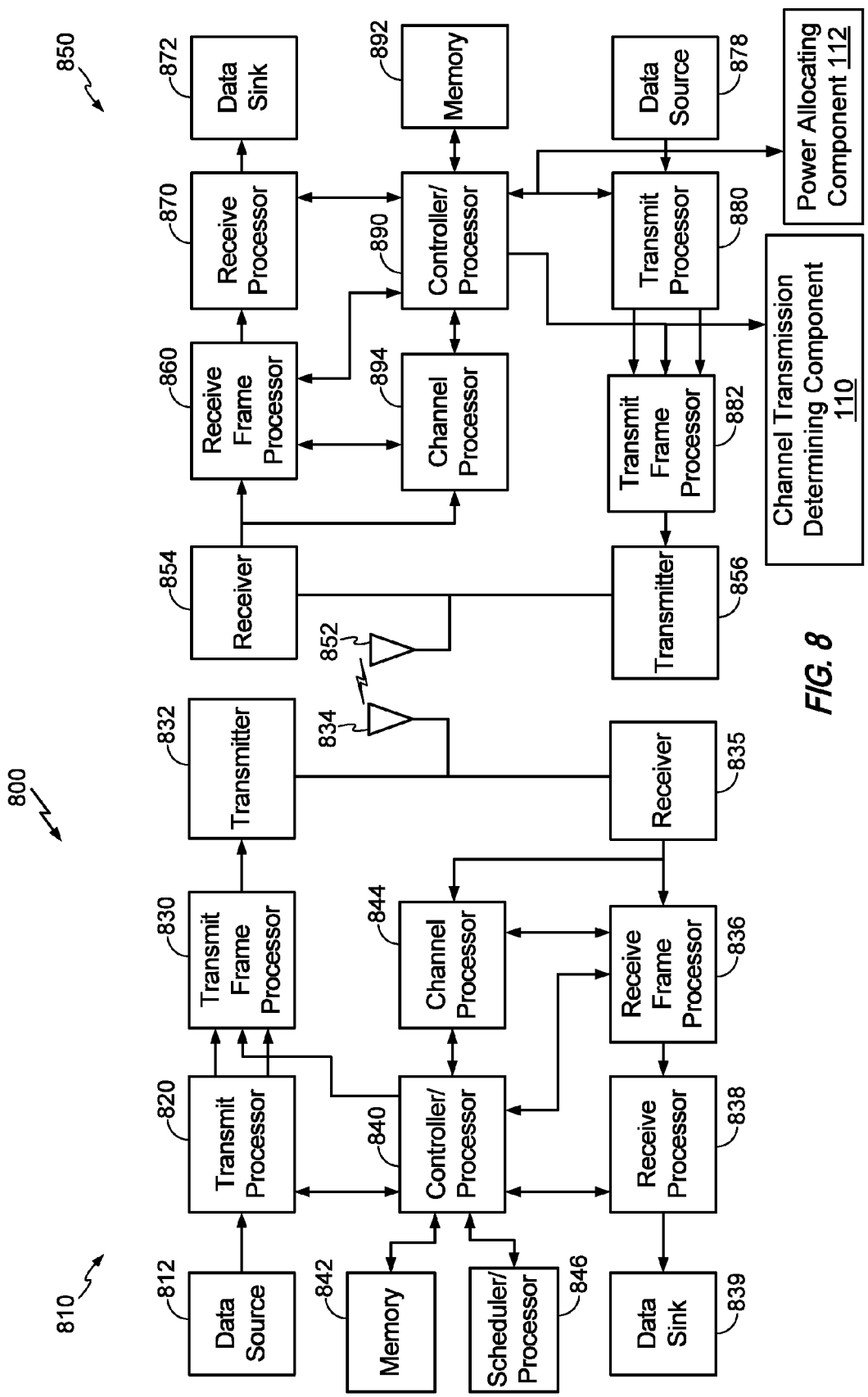
FIG. 8 is a diagram illustrating an example of an evolved Node B and user equipment in an access network.

FIG. 8 is a block diagram of a Node B 810 in communication with a UE 850, where the Node B 810 may be or may include network entity 104 (FIG. 1), Node B 508 (FIG. 5), etc., and the UE 850 may be or may include UE 102 (FIG. 1) including components thereof, etc., apparatus 400 or processing system 414 (FIG. 4), UE 510 (FIG. 5), etc. Accordingly, for example, UE 850 may include channel transmission determining component 110, power allocating component 112, components thereof, etc. (e.g., in FIG. 1), which may be configured to carry out one or more methods or procedures described herein (e.g., method 200 in FIG. 2) to allocate transmit power to certain channels for transmitting to Node B 508 or other network entities. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receive processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively (e.g., to configure and/or execute functions described herein). A scheduler/processor 846 at the Node B 810 may be used to allocate resources to the UEs and schedule downlink and/or uplink transmissions for the UE.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: at least one a; at least one b; at least one c; at least one a and at least one b; at least one a and at least one c; at least one b and at least one c; and at least one a, at least one b and at least one c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

The invention claimed is:

1. A method of allocating transmission power by a device in wireless communications, comprising:
   determining, by the device, whether data is to be transmitted on an uplink control channel in one or more upcoming transmission time intervals (TTIs); and
   allocating, by the device, transmission power to an uplink enhanced dedicated channel in the one or more upcoming TTIs based at least in part on the determining,
   wherein the determining whether the data is to be transmitted on the uplink control channel comprises determining whether acknowledgement feedback data is to be transmitted in the one or more upcoming TTIs, and
   wherein the determining whether the acknowledgment feedback data is to be transmitted in the one or more upcoming TTIs is based at least in part on determining one or more previous TTIs during which one or more data transmissions, received over a downlink shared channel and associated with the acknowledgement feedback data, are scheduled to be decoded.

2. The method of claim 1, wherein allocating the transmission power comprises allocating a portion of the transmission power to the uplink control channel and allocating another portion of the transmission power to the uplink enhanced dedicated channel, and wherein the determining includes determining that data is to be transmitted on the uplink control channel in at least some of the one or more upcoming TTIs.

3. The method of claim 1, wherein allocating the transmission power comprises allocating the transmission power to the uplink enhanced dedicated channel in the one or more upcoming TTIs, and wherein the determining includes determining that data is not to be transmitted on the uplink control channel in the one or more upcoming TTIs.

4. The method of claim 1, wherein determining whether the data is to be transmitted on the uplink control channel further comprises determining whether channel quality indicator (CQI) data is to be transmitted in the one or more upcoming TTIs.

5. The method of claim 4, wherein determining whether CQI data is to be transmitted in the one or more upcoming TTIs is based at least in part on determining a configured CQI feedback cycle.

6. The method of claim 5, wherein the configured CQI feedback cycle is based at least in part on one or more parameters configured by a network for reporting CQI feedback relating to communications received over one or more downlink channels configured by the network.

7. The method of claim 1, wherein the uplink control channel is a high speed dedicated physical control channel (HS-DPCCH) and allocating the transmission power comprises selecting an enhanced dedicated channel (E-DCH) transport format combination identifier (E-TFCI) for the uplink enhanced dedicated channel in a high speed packet access (HSPA) configuration.

8. An apparatus for allocating transmission power in wireless communications, comprising:
   a memory; and
   at least one processor coupled to the memory and configured to:
      determine whether data is to be transmitted on an uplink control channel in one or more upcoming transmission time intervals (TTIs); and
      allocate transmission power to an uplink enhanced dedicated channel in the one or more upcoming TTIs based at least in part on the determining whether the data is to be transmitted on the uplink control channel,
   wherein the at least one processor is configured to determine whether the data is to be transmitted on the uplink control channel at least in part by determining whether acknowledgement feedback data is to be transmitted in the one or more upcoming TTIs, and
   wherein the at least one process is configured to determine whether the acknowledgment feedback data is to be transmitted in the one or more upcoming TTIs at least in part by determining one or more previous TTIs during which one or more data transmissions, received over a downlink shared channel and associated with the acknowledgement feedback data, are scheduled to be decoded.

9. The apparatus of claim 8, wherein the at least one processor is configured to allocate the transmission power at least in part by allocating a portion of the transmission power to the uplink control channel and allocating another portion of the transmission power to the uplink enhanced dedicated channel, and to determine that data is to be transmitted on the uplink control channel in at least some of the one or more upcoming TTIs.

10. The apparatus of claim 8, wherein the at least one processor is configured to allocate the transmission power at least in part by allocating the transmission power to the uplink enhanced dedicated channel in the one or more upcoming TTIs, and to determine that data is not to be transmitted on the uplink control channel in the one or more upcoming TTIs.

11. The apparatus of claim 8, wherein the at least one processor is further configured to determine whether the data is to be transmitted on the uplink control channel at least in part by determining whether channel quality indicator (CQI) data is to be transmitted in the one or more upcoming TTIs.

12. The apparatus of claim 11, wherein the at least one processor is configured to determining whether CQI data is to be transmitted in the one or more upcoming TTIs based at least in part on determining a configured CQI feedback cycle.

13. The apparatus of claim 12, wherein the configured CQI feedback cycle is based at least in part on one or more parameters configured by a network for reporting CQI feedback relating to communications received over one or more downlink channels configured by the network.

14. The apparatus of claim 8, wherein the uplink control channel is a high speed dedicated physical control channel (HS-DPCCH) and the at least one processor is configured to allocate the transmission power at least in part by selecting an enhanced dedicated channel (E-DCH) transport format combination identifier (E-TFCI) for the uplink enhanced dedicated channel in a high speed packet access (HSPA) configuration.

15. An apparatus for allocating transmission power in wireless communications, comprising:
  means for determining whether data is to be transmitted on an uplink control channel in one or more upcoming transmission time intervals (TTIs); and
  means for allocating transmission power to an uplink enhanced dedicated channel in the one or more upcoming TTIs based at least in part on the means for determining determining whether the data is to be transmitted on the uplink control channel,
  wherein the means for determining determines whether the data is to be transmitted on the uplink control channel at least in part by determining whether acknowledgement feedback data is to be transmitted in the one or more upcoming TTIs, and
  wherein the means for determining determines whether the acknowledgment feedback data is to be transmitted in the one or more upcoming TTIs at least in part by determining one or more previous TTIs during which one or more data transmissions, received over a downlink shared channel and associated with the acknowledgement feedback data, are scheduled to be decoded.

16. The apparatus of claim 15, wherein the means for allocating allocates the transmission power at least in part by allocating a portion of the transmission power to the uplink control channel and allocating another portion of the transmission power to the uplink enhanced dedicated channel, and wherein the means for determining determining that data is to be transmitted on the uplink control channel in at least some of the one or more upcoming TTIs.

17. The apparatus of claim 15, wherein the means for allocating allocates the transmission power at least in part by allocating the transmission power to the uplink enhanced dedicated channel in the one or more upcoming TTIs, and wherein the means for determining determines that data is not to be transmitted on the uplink control channel in the one or more upcoming TTIs.

18. The apparatus of claim 15, wherein the means for determining further determines whether the data is to be transmitted on the uplink control channel at least in part by determining whether channel quality indicator (CQI) data is to be transmitted in the one or more upcoming TTIs.

19. A non-transitory computer-readable medium storing computer executable code for allocating transmission power by a device in wireless communications, comprising:
  code executable to determine, by the device, whether data is to be transmitted on an uplink control channel in one or more upcoming transmission time intervals (TTIs); and
  code executable to allocate, by the device, transmission power to an uplink enhanced dedicated channel in the one or more upcoming TTIs based at least in part on whether the data is to be transmitted on the uplink control channel,
  wherein the code executable to determine determines whether the data is to be transmitted on the uplink control channel at least in part by determining whether acknowledgement feedback data is to be transmitted in the one or more upcoming TTIs, and
  wherein the code executable to determine determines whether the acknowledgment feedback data is to be transmitted in the one or more upcoming TTIs at least in part by determining one or more previous TTIs during which one or more data transmissions, received over a downlink shared channel and associated with the acknowledgement feedback data, are scheduled to be decoded.

20. The non-transitory computer-readable medium of claim 19, wherein the code executable to allocate allocates the transmission power at least in part by allocating a portion of the transmission power to the uplink control channel and allocating another portion of the transmission power to the uplink enhanced dedicated channel, and wherein the code executable to determine determines that data is to be transmitted on the uplink control channel in at least some of the one or more upcoming TTIs.

21. The non-transitory computer-readable medium of claim 19, wherein the code executable to allocate allocates the transmission power at least in part by allocating the transmission power to the uplink enhanced dedicated channel in the one or more upcoming TTIs, and wherein the code executable to determine determines that data is not to be transmitted on the uplink control channel in the one or more upcoming TTIs.

22. The non-transitory computer-readable medium of claim 19, wherein the code executable to determine further determines whether the data is to be transmitted on the uplink control channel at least in part by determining whether channel quality indicator (CQI) data is to be transmitted in the one or more upcoming TTIs.

23. The non-transitory computer-readable medium of claim 22, wherein the code executable to determine determines whether CQI data is to be transmitted in the one or more upcoming TTIs based at least in part on determining a configured CQI feedback cycle.

24. The apparatus of claim 18, wherein the means for determining determines whether CQI data is to be transmitted in the one or more upcoming TTIs based at least in part on determining a configured CQI feedback cycle.

25. The apparatus of claim 24, wherein the configured CQI feedback cycle is based at least in part on one or more parameters configured by a network for reporting CQI feedback relating to communications received over one or more downlink channels configured by the network.

26. The apparatus of claim 15, wherein the uplink control channel is a high speed dedicated physical control channel (HS-DPCCH) and the means for allocating allocates the transmission power at least in part by selecting an enhanced dedicated channel (E-DCH) transport format combination identifier (E-TFCI) for the uplink enhanced dedicated channel in a high speed packet access (HSPA) configuration.

27. The non-transitory computer-readable medium of claim 23, wherein the configured CQI feedback cycle is based at least in part on one or more parameters configured by a network for reporting CQI feedback relating to communications received over one or more downlink channels configured by the network.

28. The non-transitory computer-readable medium of claim 19, wherein the uplink control channel is a high speed dedicated physical control channel (HS-DPCCH) and the code executable to allocate allocates the transmission power at least in part by selecting an enhanced dedicated channel (E-DCH) transport format combination identifier (E-TFCI) for the uplink enhanced dedicated channel in a high speed packet access (HSPA) configuration.

* * * * *